May 27, 1958

W. S. BOYLE ET AL 2,836,703

LOW VOLTAGE ARC WELDING CIRCUIT FOR USE
WITH PERCUSSION HAND WELDER

Filed June 19, 1956

INVENTORS W. S. BOYLE
J. L. SMITH

BY

H. O. Wright

ATTORNEY

2,836,703

LOW VOLTAGE ARC WELDING CIRCUIT FOR USE WITH PERCUSSION HAND WELDER

Willard S. Boyle, Berkeley Heights, and James L. Smith, Basking Ridge, N. J., assignors to Bell Telephone Laboratories, Incorporated, New York, N. Y., a corporation of New York Application June 19, 1956, Serial No. 592,366

6 Claims. (Cl. 219—95)

This invention relates to an arc welding method, circuits, and apparatus for forming good electrical and strong mechanical connections between electrical conductors and the appropriate apparatus terminals in communication circuits and miscellaneous electrical equipment, such, for example, as radio and television apparatus.

The method contemplates the making of such connections with equal or greater facility than by soldering and the avoidance of the various weaknesses and difficulties encountered in the use of soldered connections.

More particularly, it relates to improved energy storage circuits for use in the making of suitable connections of the above-indicated type by means of a tool, commonly known in the art as a "welding gun."

It is directed especially toward the elimination of poorly welded connections concurrently with the reduction of the voltages commonly heretofore employed in the energy storage circuits used with "welding guns." As taught in the copending application of A. L. Quinlan, Serial No. 581,074, filed April 27, 1956, lower voltages are employed to reduce or completely eliminate the hazard of electrical shock to personnel using the "welding gun."

The general method contemplated in connection with the above-mentioned copending application of A. L. Quinlan and the present invention is commonly characterized in the art as a "percussion" or percussive" arc welding method. In accordance with this general method, the electrical power required to effect the weld is stored in a capacitor, or in capacitors, in a circuit connected to the welding tool or gun.

The tool is generally called a "gun" since it is usually in the form of a hand tool having a pistol grip and a trigger control. A welding tool or gun specifically designed for use with lower voltages is described in detail in the above-mentioned application of A. L. Quinlan. The trigger control is arranged to simultaneously release a spring-operated mechanism to bring the parts to be welded together with appreciable velocity, for example, at a velocity of 50 inches per second, and to complete the necessary electrical connections to the energy storage circuit to establish an electrical arc between the surfaces to be welded as they are brought together.

The weld is effected by the electrical arc which is initiated when the separation between the parts to be welded together is sufficiently small to permit an arc to be established. The arc is normally, and necessarily, extinguished when the parts to be welded are brought firmly together. Premature extinction of the arc, excessive prolongation of the arc, or interruptions of the arc, arising from the inadequacy of the welding energy storage circuit or other deficiencies of the apparatus, may result in defective welds, or less desirable welding performance, as will become apparent hereinunder.

The apparatus elements to be welded together are commonly designated "electrodes" and will frequently be referred to as such throughout the remainder of the present specification and in the appended claims.

One function of the arc is to heat the opposing surfaces to be welded together and to form a thin layer of molten metal on each as the electrodes are brought together. After they are brought firmly together, cooling solidifies the molten metal and the weld is completed.

To aid in inducing the initiation of the arc it is taught in the above-mentioned application of A. L. Quinlan that one of the electrodes (usually the wire) should be "feathered" or brought to a point. A preferred form of "feathering" will be described hereinbelow. To obtain a full area contact between the electrodes the "feather" must, of course, be completely burned off by the arc. This requires a surge of power at the initiation of the arcing process sufficient to burn back the "feather" at least as rapidly as the electrodes are being brought together, in addition to the power required for forming the layers of molten metal as described above. The "burn-off" operation also, obviously, increases the arc duration time. This is a particularly important factor for low voltage operation since, for example, a potential of 50 volts will not normally initiate an arc across the air gap until it has closed to approximately 0.00005 inch. Therefore, without the additional time made available by the "burn-off" operation, a sufficient duration of the arc to form a good weld, prior to extinction of the arc by firm contact between the electrodes, could not be readily realized.

An alternative arrangement, providing additional assurance of sufficient arc duration to form a good weld with a low voltage welding energy supply circuit, involves the use of an auxiliary high voltage, low current, energy supply circuit which charges a small capacitor to a voltage sufficient to cause the arc to strike, or form, at a substantially greater electrode separation. Though several hundred (for example 400) volts may be required to strike, or form, the arc at a suitably large electrode separation, when once formed, the arc can be sustained, for example, by a voltage of substantially 14 volts between clean copper electrodes. This alternative arrangement utilizes a diode as a switch to isolate the high voltage circuit from the low voltage circuit and to connect the low voltage energy storage circuit to the electrodes when the arc has been established. A current limiting resistance in the high voltage circuit eliminates the hazard of dangerous electrical shock to operating personnel but permits charging of the small "arc striking" capacitor to the higher voltage. This alternative arrangement is the sole invention of applicant J. L. Smith and is described in detail and claimed in his copending application, Serial No. 592,386, being filed on June 19, 1956, concurrently with the present application.

Since both electrodes are normally good heat conductors (copper, brass, aluminum, or the like) appreciable power will be lost from the immediate vicinity of the arc by heat conduction. This power must, obviously, also be supplied by the supply circuit.

For any specific sizes, materials, and configurations of the two electrodes the heat conduction loss characteristic for a predetermined welding operation is readily computed by conventional methods. An important principle of the present invention is that the power supplied for the welding operation should be well in excess of the heat conduction loss at each instant throughout the desired arc duration interval, i. e. from the instant the arc is formed until the instant the arc is extingushed by the firm closure of the electrodes. To assure satisfactory maintenance of the above-mentioned molten metal layers and an adequate "burn back" rate, in addition to replacing the above-noted heat conduction loss, it has been found that the total power supplied, during the arcing interval, should be at least fifty percent greater and preferably in the order of one hundred percent greater than the heat conduction loss.

On the other hand, if power substantially in excess of that indicated above is supplied from the storage circuit excessive "burn back" of the smaller electrode may prevent firm closure of the electrodes until the storage circuit energy has been depleted to the point that the arc is terminated by lack of sufficient power to sustain it and before firm closure of the electrodes has been effected. Premature cooling of the molten films in such cases may then result in the formation of an imperfect, weak, weld. Another objectionable feature resulting from supplying excessive power may be the formation of excessive molten metal which, upon firm closure of the electrodes, will tend to form an unsightly mound about the weld. This not only detracts from the neatness and general appearance of the weld but even, at times, interferes with the assembly or proper functioning of the apparatus. In addition, the use of excessive power represents inefficient design and places more severe requirements upon the energy storage circuits.

Should the power, during the desired arcing interval, be permitted to fall below that required to replace the heat conduction loss, the arc will be prematurely extinguished and the electrostatic field then tends to draw one or more filaments of molten metal across the gap between electrodes. Such filaments make it virtually impossible to re-establish a satisfactory arc prior to closure of the electrodes. The result in such cases is a weak and imperfect weld.

In view of the above factors, it is apparent that reasonably precise control of the amount of power and the duration of the energy pulse supplied are important to the success and efficiency of percussion arc welding operations.

The principal object of the present invention is to eliminate faulty welds in percussion welding operations.

Further objects of the invention are to eliminate excess weight and the use of either insufficient or excess energy in forming a weld with a hand arc welding tool.

Still further objects are to afford more accurate control of arc and energy surge durations in an arc welding circuit.

Still another object is to more effectively control the power supplied to the arc in an arc welding circuit so that the power available to sustain the arc will be sufficient, but not excessive, throughout the entire required arc duration interval.

Other objects, features, and advantages of the invention will become apparent during the course of the following detailed description of an illustrative embodiment incorporating various principles of the present invention.

Figure 1:
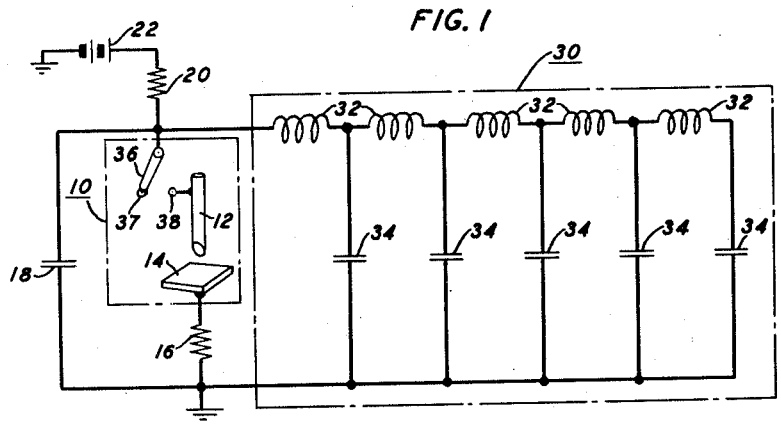
Fig. 1 shows in schematic diagram form an illustrative system of the invention.

Before undertaking the detailed description of the figures of the accompanying drawings, the considerations upon which the design of arrangements of the present invention are based can well be briefly reviewed.

Since, as taught in the above-mentioned application of A. L. Quinlan, it is desirable to avoid voltages which involve a hazard to the person operating the hand tool, it is felt that a voltage at least well below 1000 volts should be used. By way of example, voltages not greater than 400 volts involve much less danger to the person operating the tool and function satisfactorily with the arrangements of the present invention.

The use of voltages in the order of 400 volts is probably advisable where relatively large conductors, for example conductors having a diameter of 40 mils or greater, are to be welded.

For smaller conductors, and even for making an occasional weld involving reasonably large conductors, a supply source having a voltage in the order of 50 volts is entirely adequate.

In many instances it is entirely practicable that a portion, or even the complete, power supply and storage circuit be placed within or attached to the welding tool or gun, as will be discussed in more detail hereinafter.

Alternatively, certain parts, to be described in more detail hereinafter can be placed in or attached to the tool or gun and others can be arranged to be carried on the person of the operator, or otherwise placed conveniently near the situation in which the welding is to be performed.

As background information on short arcs between electrodes of various materials, reference may be had to a paper entitled "Arcing of Electrical Contacts in Telephone Switching Circuits," by M. M. Atalla, part I of which was published in the Bell System Technical Journal, volume 32, pages 1231 to 1244, September 1953, and part II of which was published in the same Journal, volume 32, pages 1493 to 1506, November 1953, together with the related publications to which reference is made in the above-named article.

As taught by Atalla, for potentials below the minimum sparking potential in air, breakdown occurs at fields in the order of $10^6$ volts per inch, or at an electrode separation in the order of $5 \times 10^{-5}$ inch at 50 volts. This distance may vary by a factor of five from one breakdown to the next, depending on the local geometry of the electrodes and systematically by a similar factor for different electrode materials. In any event, when, as is the case with welding guns, the electrodes are brought together at a velocity in the order of 10 to 50 inches per second, the elapsed time between the instant of breakdown and mechanical closure of the original electrode surfaces will be only a few microseconds. As mentioned above, for operation with a supply voltage in the order of 50 volts, in order that the arc duration be sufficient to produce a good weld, it is necessary that an additional time interval, usually, for example, in the order of 275 microseconds, be gained by "burning back" the original surface of at least one of the electrodes and at a velocity at least equal to that with which the electrodes are being brought together.

Obviously, as a practical matter, it is not desirable to place too rigid or precise speed control requirements upon the mechanism by which the electrodes are brought together.

Figure 3:
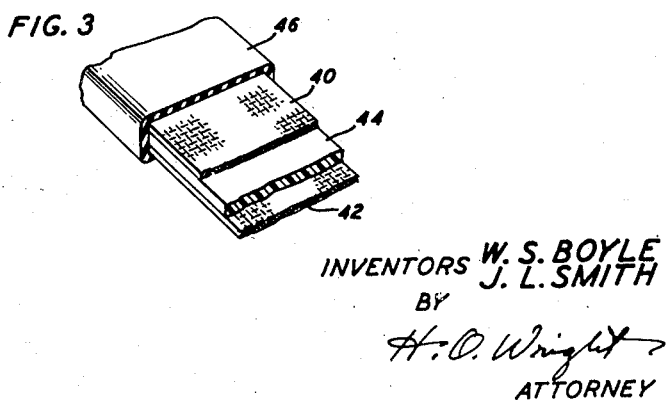
Fig. 3 illustrates a transmission line useful in particular circuits of the invention.

The above considerations require that the current through the arc must increase almost instantaneously so that sufficient power to effect the necessary "burning back" will be available at the instant the arc is initiated. In general, it is preferable that the initial surge of power be sufficient to substantially remove the feather. This, in turn, requires that at least a portion of the energy storage circuit be connected to the electrodes by conductors having very little series inductance, since the initial effect of series inductance is to retard current rise. The requirement can be met either by keeping the electrode leads to the storage circuit portion providing the initial large power surge very short or by employing a section of flexible "transmission line" of inherently low inductanc to connect the storage source providing the initial surge of power to the electrodes. Such a "transmission line" can, by way of example, comprise a pair of copper ribbons, or copper braids, in the order of an inch in width, separated by a strip of dielectric ribbon, such as polyethylene, 25 mils in thickness, the whole being insulated by a covering of rubber or other suitable flexible insulating material, as illustrated in Fig. 3, described hereinbelow. Even with the best available leads their inductance and the inherent inductance of other elements in the circuit in which the arc is established will delay the rise to the required current of 400 or more amperes an appreciable number of microseconds. However, the increased time afforded by feathering is entirely adequate to permit the desired current amplitude to be obtained and maintained for a suitable interval.

As previously mentioned, substantially loss of power by heat conduction away from the arc will be encountered during the welding operation. To avoid premature cooling of the surface areas to be welded, or even extinction of the arc, it is necessary, not only to provide an initial large surge of power but also to provide an adequate sustained surge of power throughout at least the complete welding interval (circa 275 microseconds, in the specific illustrative example described below) sufficient to replace conduction loss and to maintain the molten condition of the surfaces to be welded together until firm closure of the electrodes has been effected.

In accordance with the principles of the present invention, the energy storage supply circuit is, therefore, composed of two portions one of which supplies the initial quick surge of power and the other of which supplies a less sharply rising but sustained surge of power having a duration at least equal to the duration of the welding operation. The combination is designed to supply an over-all power surge substantially in excess of that required to replace conduction loss throughout the entire welding operation and at the same time to provide definite limitation of the power supplied so that it is adequate, but not excessive, at each instant during the welding operation and is definitely terminated shortly after completion of the welding operation.

In more detail in the specific illustrative embodiment shown in Fig. 1, element 12 represents a length of copper wire, which may be, for example, 20 mils in diameter and which it is desired to weld to element 14. Element 14 can, for example, be a portion of a terminal strip on a relay or the like. It can be of copper or brass, for example. The lower end of element 12 is cut at an angle of substantially 60 degrees to provide a "feathered" end with a sharp point. This specific form of "feather" is preferable to the more usual wedge shaped point commonly used in prior art percussion welding arrangements since in the initial stage of the "burn back" operation, i. e., of the burning off of the "feather" from the end of wire 12, less metal need be burned off and consequently less energy is immediately required to effect the burn back in the initial stage of the operation. Elements 12 and 14 are, as mentioned above, commonly referred to as the electrodes and are usually held by a mechanism, not shown in detail, but represented schematically by broken line box 10, known as a welding gun, a number of forms of which are well known to those skilled in the art. By way of examples, the above-mentioned application of A. L. Quinlan and United States Patent 2,184,627 granted December 26, 1939, to G. W. Watson, show forms of welding guns. The functions of the gun are to act as a switching mechanism for the circuit, by throwing a switch blade, for example, the blade of switch 36 in Fig. 1, from its open or charging position (37) to its discharging position (38), and to bring the electrodes (12) and (14) rapidly together, by means of a spring operated mechanism, at a rate, for example, in the order of 50 inches per second. Pulling the trigger of the gun, therefore, starts the welding process which the gun and associated energy storage circuit then complete. Source 22 recharges the storage circuit following the completion of a weld, when the release of the gun trigger, for example, restores switch 36 to its charging position 37.

In accordance with one form of the present invention, the source of charging potential 22 is preferably a relatively low voltage source having, for example, a voltage of approximately 50 volts. It is connected through resistor 20 to electrode 12, capacitor 18, and the extreme left inductor 32 of the inductive-capacitative electrical network or transmission line 30. Line 30 comprises, as shown, five series connected inductors 32 and five shunt connected capacitors 34, the assembly comprising a five-section, ladder-type, electrical network. It is designed, in accordance with principles well known to those skilled in the art, to produce a pulse of power in the order of 350 microseconds in duration, as will be described in connection with Fig. 2. The opposite or lower terminals of capacitor 18 and line 30 are connected together and to ground and through resistor 16 to electrode 14, as shown. The upper terminal of potential source 22 is also connected to ground, as shown.

Initially, with switch 36 in its open position 37 (or with electrodes 12 and 14 separated sufficiently to inhibit arcing across them) source 22 charges capacitor 18 and the capacitors 34 of transmission line 30 to substantially its full voltage of, for example, 54 volts. Resistor 20 limits the charging current to a reasonably small value. In a typical design, for example, where source 22 had a voltage of 54 volts, resistor 20 had a resistance of 1000 ohms.

By triggering the welding gun, represented diagrammatically by broken line box 10, switch 36 is thrown to position 38 and the electrodes 12 and 14 are made to approach each other. When they reach a separation in the order of 0.00005 inch, an arc across (or between) electrodes 12 and 14 will be initiated and sustained principally at first by the charged capacitor 18 acting through resistor 16, which in a typical design, for example, had a resistance of .04 ohm. Since the lower end of electrode 12 is feathered (or pointed) the arc will burn it back, thus for a short time interval, in the order of 275 microseconds, for example, preventing firm contact between electrodes 12 and 14.

Figure 2:
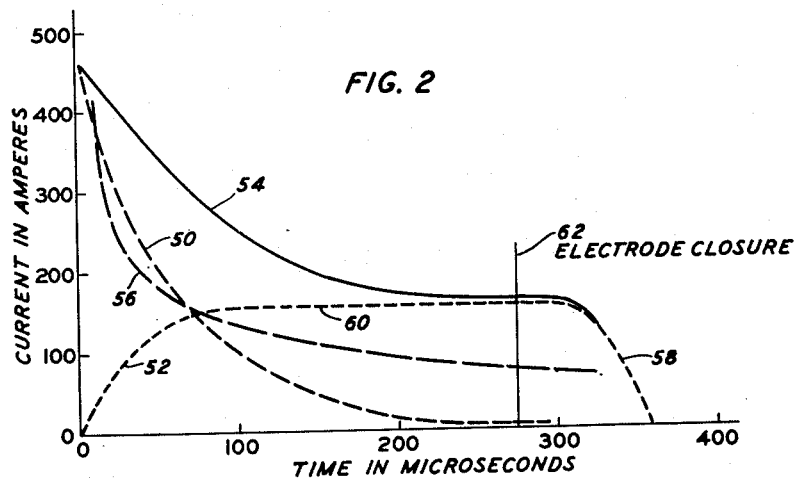
Fig. 2 shows curves illustrative of the operation of the system of Fig. 1.

In Fig. 2 the current versus time relations during a typical welding operation with the system diagrammatically illustrated in Fig. 1, are shown.

Curve 50 (dash line) represents the discharge of capacitor 18 through resistor 16 and electrodes 12, 14 from the initiation of an arc between the electrodes, at "zero" time, to "electrode closure" represented by vertical line 62 at substantially 275 microseconds.

Curve 52—60—58 represents the sustained surge of power contributed by the discharge of line 30. Obviously, it need not rise too sharply (portion 52) since capacitor 18 contributes an adequate initial surge (curve 50) but during the interval between substantially 125 and 300 microseconds it contributes the greater portion of the power required to sustain the arc, to prevent cooling of the molten metal films, and to offset the heat conduction loss from the surfaces to be welded. The latter loss is represented by curve 56 (long-dash line).

Curve 54 (solid line) represents the sum of the power contributed by both capacitor 18 and line 30. At the completion of the welding process and less than 100 microseconds following firm electrode closure (line 62), energy from the storage circuit drops to substantially zero, as indicated by portion 58 of the curve representing the pulse from line 30, and the weld is completed by cooling.

Actually, there will also be a small surge of power at the instant of electrode closure, arising from the elimination of the back-electromotive force of approximately 14 volts generated by the arc. Since it is small, of short duration, and has no really significant effect upon the welding process, it has been omitted in Fig. 2.

It should be particularly noted that, as stated above, the total power (curve 54 and portion 58 of the line power pulse) drops to zero shortly after electrode closure. In general, for satisfactory welds the total power (curve 54) should be in the order of 50 to 100 percent greater than the conduction loss throughout the welding interval.

Otherwise, as discussed hereinabove, imperfect or weak welds may result from failure to completely burn back the feather on the wire electrode so that a full area weld is not obtained, or from premature cooling of portions of the liquid films on the surfaces to be welded so that only partial welding takes place. Excessive power is objectionable for reasons also stated in detail hereinabove.

In an actual design of a welding system of the type illustrated by Fig. 1, which produced uniformly good welds, charging source 22 was a 54 volt battery, resistor 20 had a resistance of 1000 ohms, capacitor 18 comprised six Western Electric 125 microfarad, 450 volt, electrolytic condensers in parallel (750 microfarads total), resistor 16 had a resistance of .04 ohm, inductors 32 were each inductances of eight microhenries, capacitors 34 each comprised four Mallory TC-36, 50 microfarad, 50 volt electrolytic condensers in parallel (200 microfarads total for each), and gun 10 brought the electrodes together at a velocity of 50 inches per second. The copper wire electrode was 20 mils in diameter. The internal resistance of capacitor 18 was approximately equivalent to an added series resistance of 0.05 ohm.

A similar welding system, designed to use a 400 volt charging source, also produced uniformly good welds.

In general, systems of the invention, as described in detail above, appear ideal, not only for regular manufacturing purposes in a factory, but also as repair and maintenance service hand tools since they can employ components all of which, in the present state of the art, are readily made small, compact, and light. Accordingly, they can be assembled in the handle of the welding gun, or attached to the gun, to provide a unitary, light, hand tool, operating on a small light battery, the voltage of which is moderate so that hazards from severe electrical shock to personnel are eliminated.

For welding larger conductors a welding system of the invention using a charging source having a voltage in the order of 400 volts is preferable, as mentioned above, but would still present greatly reduced hazards of injury by electrical shock to personnel using the system.

At least the capacitor 18 and resistor 16 of Fig. 1 could, for any arrangement of the invention, be mounted in the handle or attached to the welding gun so that only very short leads having negligible inductance could be employed to connect them to the electrodes. Leads from the section of transmission line 30, Fig. 1, obviously, need not be of low inductance since the series arm 32 connected to the upper electrode 12 through switch 36, is an inductance and, as shown by the curve 52 of Fig. 2, it is not necessary that the power pulse of the line 30 rise sharply. If used with leads of substantial inductance the value of the output inductor 32 of line 30 can be correspondingly decreased, it being in effect partly replaced by the inductance of the leads.

In Fig. 3, a type of transmission line having negligible inductance is shown and may be used to connect capacitor 18 of Fig. 1 to the electrodes in any instance in which an extremely light welding gun is deemed desirable. The line of Fig. 3 comprises two thin conductive tapes in the order of an inch in width. These conductive tapes can conveniently be of copper braid, or thin strips of copper. They are separated by a tape of insulating material 44 in the order of 25 mils thick which tape can be of polyethylene, or rubber, and the over-all line is covered by a layer of flexible insulating material 46 which, by way of example, can be of rubber, or plastic. The use of a section of transmission line of the type illustrated in Fig. 3 will permit the welding gun to be used at a considerable distance from the remainder of a welding system, such as is illustrated in Fig. 1, without introducing a troublesome amount of inductance between capacitor 18 and the electrodes to be welded together.

A curious phenomena observed with welding systems of the invention is that just before the electrodes come firmly into contact with each other a very substantial pressure can build up between them. In one instance this pressure was found to be substantially 35 atmospheres. This effect was scarcely noticeable with a 20 mil diameter wire as one electrode, but with somewhat larger wire, i. e. with 40 mil diameter wire, it made necessary the use of a stronger spring for the gun mechanism which brought the electrodes together.

Numerous and varied arrangements within the spirit and scope of the principles of the present invention can readily be devised by those skilled in the art. No attempt to exhaustively illustrate all such possibilities has here been made.

What is claimed is:

1. An arc welding system for welding an electrode, comprising a conductor, to an electrode, comprising an apparatus terminal, said electrodes having a known heat conduction loss characteristic, said system including a first electrical energy storage means characterized by a high power, rapid discharge, a second electrical energy storage means characterized by a predetermined, substantially constant, power discharge over a predetermined time interval, means having negligible inductance connecting said first storage means to said electrodes, means connecting said second storage means to said electrodes, means for charging both of said storage means and means for bringing said electrodes together with a predetermined velocity to produce an arc discharge between said electrodes over a major portion of said predetermined time interval, the sum of said rapid and said constant power discharges exceeding the conduction loss of said electrodes over said predetermined time interval whereby the electrical energy applied to said electrodes will become substantially zero shortly after closure of said electrodes and said electrodes will become welded upon cooling.

2. The method of electric arc welding two metallic electrode members having a known heat conduction loss characteristic, said method comprising feathering one of said electrode members, bringing said electrode members together at an appreciable velocity, sending a first surge of electrical energy across the gap between said electrodes at the initiation of an arc between them, said surge being sufficient to burn back the feather on said one electrode at a rate at least equal to the velocity at which said electrodes are approaching and sending a second sustained surge of energy of predetermined amplitude through said electrodes until after closure between the electrodes has been effected, the sum of said surges of energy being, at each instant, substantially in excess of said heat conduction loss characteristic of said electrodes during the arcing interval and terminating said energy surges after closure between said electrodes has been effected, whereby a strong, neat weld is effected between said electrodes.

3. An electrical energy storage supply circuit for electrical arc welding of conductive electrodes having a known heat conduction loss characteristic, said circuit comprising a first capacitor having a substantial energy storage capacity, means having negligible inductance for connecting said capacitor to said electrodes, a section of transmission line comprising a plurality of like series inductors and a plurality of like shunt capacitors alternately connected to form a ladder-type electrical network, means for connecting said network to said electrodes and means for charging all caapcitors of said circuit to a predetermined voltage, whereby, as said electrodes are brought together, a large instantaneously available surge of power from said first capacitor and a sustained surge of power from said network will be available for forming and sustaining a continuous arc, the sum of said power surges being substantially in excess of the conduction loss characteristic of said electrodes from the instant of initiation of said arc until after said arc is extinguished by closure of said electrodes.

4. An energy storage circuit for use in an arc welding system for welding a pair of electrodes, said circuit comprising a capacitor and resistor connected in series, and a ladder-type network comprising a plurality of inductors and capacitors connected alternately in series and in shunt, respectively, said network being connected in parallel with said first-mentioned capacitor, and low inductance leads connecting said first-mentioned capacitor in parallel with said electrodes.

5. An arc welding system comprising a charging source having a voltage not exceeding 400 volts, an energy storage circuit comprising a first portion which includes a capacitor having a high capacity connected in series with a resistor having a low resistance and a second portion which includes a ladder-type electrical network comprising alternately series connected inductors and shunt connected capacitors the inductance and capacity of said network members being proportioned to produce a sustained discharge pulse of predetermined magnitude and of a duration at least substantially equal to the duration of the arc to be employed in welding, said network being connected in parallel with the capacitor of said first portion, and substantially noninductive electrical leads connecting said capacitor of said first portion to the electrodes to be welded whereby when said electrodes are brought together with appreciable velocity a strong, clean weld will result.

6. An arc welding system for welding a pair of conductive electrodes together, said electrodes having a predetermined heat conduction loss characteristic over the duration of the arc employed, said system including an energy storage circuit, said energy storage circuit including a first portion providing a short high amplitude pulse of power and a second portion providing a sustained pulse of power having an amplitude between 50 to 100 percent greater than the amplitude of said heat conduction loss characteristic of said electrodes over the duration of the arc employed, said sustained pulse being terminated by said second portion within 100 microseconds of the termination of said arc.

References Cited in the file of this patent
UNITED STATES PATENTS

| | | |
|---|---|---|
| 1,898,060 | Noble | Feb. 21, 1933 |
| 2,184,627 | Watson | Dec. 26, 1939 |